United States Patent
Saleh et al.

(10) Patent No.: US 11,801,832 B2
(45) Date of Patent: Oct. 31, 2023

(54) TRANSPORT RELOCATION

(71) Applicant: TOYOTA MOTOR NORTH AMERICA, INC., Plano, TX (US)

(72) Inventors: Aghyad Saleh, Grand Prairie, TX (US); Joshua C. Batie, Frisco, TX (US); Devang H. Parekh, Dallas, TX (US); Louis Brugman, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 18/083,409

(22) Filed: Dec. 16, 2022

(65) Prior Publication Data
US 2023/0124779 A1    Apr. 20, 2023

Related U.S. Application Data

(63) Continuation of application No. 16/831,772, filed on Mar. 26, 2020, now abandoned.

(51) Int. Cl.
| | |
|---|---|
| *G05D 22/02* | (2006.01) |
| *B60W 30/06* | (2006.01) |
| *G06Q 50/30* | (2012.01) |
| *G06Q 10/10* | (2023.01) |
| *G06F 16/245* | (2019.01) |
| *G06F 16/27* | (2019.01) |
| *G05D 1/02* | (2020.01) |
| *G06F 16/787* | (2019.01) |

(Continued)

(52) U.S. Cl.
CPC .......... *B60W 30/06* (2013.01); *G05D 1/0212* (2013.01); *G05D 1/0285* (2013.01); *G06F 16/245* (2019.01); *G06F 16/27* (2019.01); *G06F 16/787* (2019.01); *G06Q 10/10* (2013.01); *G06Q 50/30* (2013.01); *G06V 20/40* (2022.01); *G06V 20/56* (2022.01); *G05D 2201/0213* (2013.01)

(58) Field of Classification Search
CPC ... B60W 30/06; G05D 1/0212; G05D 1/0285; G06F 16/245; G06F 16/27; G06F 16/787; G06Q 10/10

See application file for complete search history.

(56) References Cited

U.S. PATENT DOCUMENTS

| | | |
|---|---|---|
| 6,900,740 B2 | 5/2005 | Bloomquist et al. |
| 8,000,887 B2 | 8/2011 | Nathan et al. |
| 8,521,817 B2 | 8/2013 | Ryan et al. |

(Continued)

FOREIGN PATENT DOCUMENTS

| | | |
|---|---|---|
| CN | 104442807 A | 3/2015 |
| CN | 104871220 A | 8/2015 |

(Continued)

*Primary Examiner* — Kira Nguyen

(57) ABSTRACT

An example operation may include one or more of detecting, by a parking processing node, a parking of a transport at an event location, accessing, by the parking processing node, a device of a transport occupant to determine a transport pickup location and a pickup time based on a conclusion of an event, detecting, by the parking processing node, from the device of the transport occupant at least one modification of the pickup location and the pickup time made based on an updated conclusion of the event, and sending a command to move the transport to a location proximate to the event based on the modified pickup location and the modified pickup time.

20 Claims, 18 Drawing Sheets

(51) Int. Cl.
  *G06V 20/40* (2022.01)
  *G06V 20/56* (2022.01)

(56) References Cited

U.S. PATENT DOCUMENTS

| | | |
|---|---|---|
| 9,449,512 B2 | 9/2016 | Zafiroglu et al. |
| 9,706,367 B2 | 7/2017 | Tao et al. |
| 9,852,551 B2 | 12/2017 | Brinig et al. |
| 10,037,030 B2 | 7/2018 | Bostick et al. |
| 10,405,215 B2 | 9/2019 | Coutinho et al. |
| 10,535,271 B1 | 1/2020 | Dyer et al. |
| 11,132,899 B1 | 9/2021 | Saleh et al. |
| 11,288,762 B2 | 3/2022 | Saleh et al. |
| 2005/0002122 A1 | 1/2005 | Ozaki et al. |
| 2005/0021225 A1 | 1/2005 | Kantarjiev et al. |
| 2006/0178949 A1 | 8/2006 | McGrath |
| 2010/0070168 A1* | 3/2010 | Sumcad ............. G01C 21/3438 701/467 |
| 2010/0302068 A1 | 12/2010 | Bandukwala |
| 2011/0034183 A1 | 2/2011 | Haag et al. |
| 2012/0068858 A1 | 3/2012 | Fredkin |
| 2012/0188100 A1 | 7/2012 | Min et al. |
| 2013/0238167 A1 | 9/2013 | Stanfield et al. |
| 2013/0293394 A1 | 11/2013 | Rubin et al. |
| 2014/0330456 A1 | 11/2014 | Morales et al. |
| 2015/0149265 A1 | 5/2015 | Huntzicker et al. |
| 2015/0161890 A1 | 6/2015 | Huntzicker |
| 2015/0279213 A1 | 10/2015 | Balter et al. |
| 2016/0116293 A1 | 4/2016 | Grover et al. |
| 2016/0364823 A1 | 12/2016 | Cao |
| 2017/0004710 A1 | 1/2017 | Dozono et al. |
| 2017/0287331 A1 | 10/2017 | Laur et al. |
| 2018/0046944 A1 | 2/2018 | Barbera et al. |
| 2018/0075380 A1 | 3/2018 | Perl et al. |
| 2018/0267541 A1* | 9/2018 | Goldberg ............... G06Q 50/30 |
| 2018/0357900 A1 | 12/2018 | Wang |
| 2019/0137290 A1* | 5/2019 | Levy .................... G05D 1/0276 |
| 2019/0166459 A1 | 5/2019 | Wootton et al. |
| 2019/0205355 A1* | 7/2019 | Moore ............... G01C 21/3614 |
| 2019/0220035 A1 | 7/2019 | Wengreen et al. |
| 2020/0104964 A1 | 4/2020 | Yasui et al. |
| 2020/0213329 A1 | 7/2020 | Simons |
| 2020/0294345 A1 | 9/2020 | Jiang |

FOREIGN PATENT DOCUMENTS

| | | |
|---|---|---|
| CN | 105378816 A | 3/2016 |
| CN | 104200649 B | 4/2016 |
| CN | 109429197 A | 3/2019 |
| CN | 109559501 A | 4/2019 |
| DE | 102015013318 A1 | 4/2017 |
| EP | 2767963 A1 | 8/2014 |
| EP | 2849017 A1 | 3/2015 |
| EP | 3250443 A1 | 12/2017 |
| JP | 2008287499 A | 11/2008 |
| JP | 2009195953 A | 9/2009 |
| JP | 6330509 B2 | 5/2018 |
| JP | 2019128244 A | 8/2019 |
| KR | 20110131872 A | 12/2011 |
| KR | 20120086140 A | 8/2012 |
| KR | 101182853 B1 | 9/2012 |
| KR | 20150038776 A | 4/2015 |
| KR | 101552500 B1 | 9/2015 |
| KR | 101711026 B1 | 3/2017 |
| KR | 20170025206 A | 3/2017 |
| RU | 2693183 C2 | 7/2019 |
| WO | 2008154476 A1 | 12/2008 |
| WO | 2015169204 A1 | 11/2015 |
| WO | 2017190794 A1 | 11/2017 |
| WO | 2019004475 A1 | 1/2019 |

* cited by examiner

TRANSPORT RELOCATION

TECHNICAL FIELD

This application generally relates to location of parking for transports, and more particularly, to transport relocation.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer, or a tablet.

Transport parking lots and parking garages may have signs that indicate availability of parking spots. For example, a parking location may have lighted signs to indicate that the parking location may be accessible. However, even when the parking spots are available, it is often very difficult to know the exact location of these spaces. It is also hard to determine which spot is the closest or the most convenient.

Accordingly, an efficient and secure way for directing the transports to the available parking spots and for automated relocation of the transport to more accessible parking spots based on an immutable storage is desired.

SUMMARY

One example embodiment may provide a method that includes one or more of detecting, by a parking processing node, a parking of a transport at an event location, accessing, by the parking processing node, a device of a transport occupant to determine a transport pickup location and a pickup time based on a conclusion of an event, detecting, by the parking processing node, from the device of the transport occupant at least one modification of the pickup location and the pickup time made based on an updated conclusion of the event, and sending a command to move the transport to a location proximate to the event based on the modified pickup location and the modified pickup time.

Another example embodiment may provide a method that includes one or more of receiving, by a destination processing node, a notification from a transport regarding a probable vacancy, determining, by the destination processing node, a probable time of availability and a location of the vacancy based on the notification, querying, by the destination processing node, a plurality of transports in a proximity of the vacancy, and assigning the location of the vacancy to a specific transport of the plurality of the transports.

Yet another example embodiment may provide a method that includes one or more of querying, by a transport, a plurality of transports within a parking area for a parking spot to be vacated, receiving, by the transport, verification to vacate the parking spots from the plurality of transports within the parking area, and determining, by the transport, locations of the parking spots to be vacated based on the verifications.

Another example embodiment may provide a system that includes a processor and memory, wherein the processor is configured to perform one or more of detect a parking of a transport at an event location, access a device of a transport occupant to determine a transport pickup location and a pickup time based on a conclusion of an event, detect from the device of the transport occupant at least one modification of the pickup location and the pickup time made based on an updated conclusion of the event, and send a command to move the transport to a location proximate to the event based on the modified pickup location and the modified pickup time.

Another example embodiment may provide a system that includes a processor and memory, wherein the processor is configured to perform one or more of receive a notification from a transport regarding a probable vacancy, determine a probable time of availability and a location of the vacancy based on the notification, query a plurality of transports in a proximity of the vacancy, and assign the location of the vacancy to a specific transport of the plurality of the transports.

Yet another example embodiment may provide a system that includes a processor and memory, wherein the processor is configured to perform one or more of query a plurality of transports within a parking area for a parking spot to be vacated, receive verification to vacate the parking spots from the plurality of transports within the parking area, and determine locations of the parking spots to be vacated based on the verifications.

A further example embodiment provides a non-transitory computer readable medium comprising instructions, that when read by a processor, cause the processor to perform one or more of detecting a parking of a transport at an event location, accessing a device of a transport occupant to determine a transport pickup location and a pickup time based on a conclusion of an event, detecting from the device of the transport occupant at least one modification of the pickup location and the pickup time made based on an updated conclusion of the event, and sending a command to move the transport to a location proximate to the event based on the modified pickup location and the modified pickup time.

A further example embodiment provides a non-transitory computer readable medium comprising instructions, that when read by a processor, cause the processor to perform one or more of receiving a notification from a transport regarding a probable vacancy, determining a probable time of availability and a location of the vacancy based on the notification, querying a plurality of transports in a proximity of the vacancy, and assigning the location of the vacancy to a specific transport of the plurality of the transports.

Yet a further example embodiment provides a non-transitory computer readable medium comprising instructions, that when read by a processor, cause the processor to perform one or more of querying a plurality of transports within a parking area for a parking spot to be vacated, receiving verification to vacate the parking spots from the plurality of transports within the parking area, and determining locations of the parking spots to be vacated based on the verifications.

DETAILED DESCRIPTION

Figure 1A:
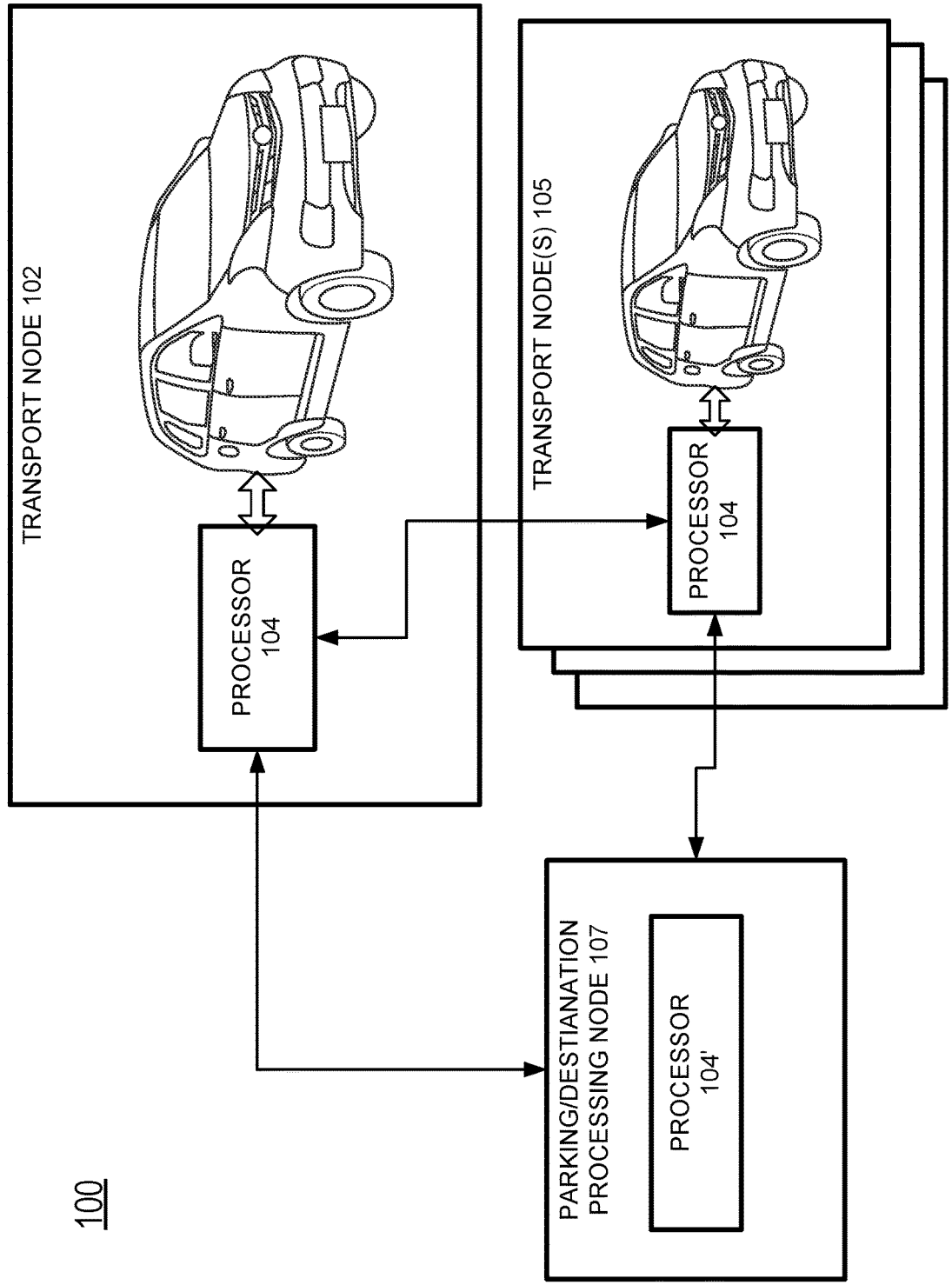
FIG. 1A illustrates a transport(s) network diagram in accordance to the example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system, which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve crypto-currencies and use consensus based on various protocols such as proof of work (PoW). On the other hand, a permissioned blockchain database provides a system, which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries, which are not endorsed, are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node, which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log, which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors, which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, lidar projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, GPS, maps and other cameras and sensors are used in an autonomous vehicles without lidar as lidar is often viewed as being expensive and unnecessary. Researchers have determined that stereo cameras are a low-cost alternative to the more expensive lidar functionality.

The instant application includes, in certain embodiments, authorizing a vehicle for service via an automated and quick authentication scheme. For example, driving up to a charging station or fuel pump may be performed by a vehicle operator, and the authorization to receive charge or fuel may be performed without any delays provided the authorization is received by the service station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

According to one exemplary embodiment, a parking processing system tracks a transport user-occupant's device (e.g., a Smartphone, a watch or a tablet) and modifies a transport pickup location and time so the transport can be moved to another parking spot closer to the modified final location of the transport after an event. This approach may take into account delays and modifications to the event's schedule. According the exemplary embodiment, a transport may be parked during the event in a parking spot associated with a location (such as an airport, a train station, or any area where a large number of transports congregate) and at the conclusion of the event, the transport may be moved to a location proximate to the transport occupant's device. The exemplary embodiment can be particularly applicable to autonomous vehicles that move themselves at the right time upon receiving a command. Calibrating of a parking location based on an amount of time the transport occupant is expected to be at the event and moving the transport to the occupant's location at the conclusion of the event can be impacted by other transports. For example, an airplane carrying the user may experience delays, cancellations, additional time at the jet bridge, etc. The system may alert the transport of such delays and the transport may react accordingly (such as returning to the original parking spot or moving from the original parking spot to an intermediate parking spot closer to the final pickup location). When the delay or cancellation wait has ended, the parking processing system moves the transport to a location proximate to the transport occupant's device when the device approaches the user's final pickup location.

In another exemplary embodiment, an indication from one specific transport (that is about to vacate a location) is provided to another transport that is seeking to occupy the location. In this embodiment, only the transports are involved via V2V communication. The exemplary embodiment ensures the most optimal placement of a transport at a physical location. In yet another embodiment, the application utilizes a server node to direct the communication to the transports and provide requisite parking instructions. In either scenario, a blockchain is used to perform authentication and coordination of placement of the transport at the location.

In yet another embodiment, a transport destination system stores physical locations available for occupancy by transports in a blockchain. For example, the physical location may be a public parking space, a private garage, a turntable for sensor testing, etc. Once a transport is about to vacate the physical location, the transport destination system receives a notification. Note that this step is different from a situation where a transport has already vacated a physical location. Then, the transport destination system may query the transports that are currently in the proximity of the parking spot that is about to be vacated. These transports may be, for example, already inside a parking garage, waiting outside the garage or about to enter a particular area, next in line at a valet or in line for a quality assurance testing, etc.

The transport destination system determines that the transport is about to vacate (has not yet vacated) a particular location, in a number of ways. In one embodiment, the transport is turned off and the system recognizes that an occupant has left the transport. This may occur via an object(s) such as a camera, a motion sensor, a door sensor located on the interior or exterior of the transport. After a certain period of time, the transport may determine that the occupant has effectively left the transport (i.e., a period of time is needed to ensure the user is not returning to the transport in the event that an item needed to be retrieved from the transport, for example). Same objects may be used to determine that the user is returning to the transport after the certain period of time. At that juncture, the transport notifies the transport destination system that it will vacate the physical location. In another embodiment, the transport can determine a time associated with a user exiting the transport and walking away from the transport at a particular distance. At that particular distance, when the transport recognizes the user, a similar period of time can be used as a basis for further determining when the transport will vacate the spot. In one example, if a user exited the transport and was at a particular distance 15 seconds later, when the user is at, or around, that particular distance, the transport can estimate it will take the user approximately 15 seconds to re-enter the transport and to prepare to vacate the location. The transport may further determine that the user may need additional time prior to vacating the physical destination (for example, the transport may determine that an additional person(s) may be walking alongside the user at the particular distance, may determine the user is in possession of various items such as packages, bags, etc. that were not previously present, the transport may determine that the user is walking slower within the particular distance to the transport than was previously noted between the transport and the particular distance (for example, the user may be interfacing with a communication device), etc. This additional time, in conjunction with the certain period of time can be used to determine when the transport will vacate the physical location. In the exemplary embodiments, the transports and the transport destination system may communicate via a blockchain network. In such a scenario, the plurality of transports are associated with a blockchain consensus, and the system may execute a smart contract to query the plurality of transports proximate to the vacancy for agreements to occupy the location of the vacancy.

In yet another embodiment, the parking spot vacancy is processed from a point of view of a transport that is looking for parking. In this embodiment, the transport communicates with other transports directly (i.e., without involvement of a destination processing node). Once the transport approaches a parking spot, the transport may query the transports in the parking lot for parking spot vacation over a blockchain network. Then, the transport may receive agreements from the transports that are about to leave their parking spots. The agreement may contain a location of the spot to be vacated and a time of a vacation. The transport may select a nearest parking spot to be vacated or a parking spot that will be vacated the earliest. In one example, the transport(s) may be traveling on a nearby street and checking if it is possible to park in the parking area or in the garage. In other words, all of the transports connected over the blockchain network and parked within a certain distance from the transport may be notified. Then, the transport may notify the transport in the selected parking spot so that the transport can wait for the transport to arrive before pulling out of the spot. In other words, a consensus to leave the spot and to provide it to another party on the blockchain is reached prior to parking of the transport.

FIG. 1A illustrates a transport(s) network diagram 100 in accordance to the exemplary embodiments. According to one exemplary embodiment, a parking processing node 107 may detect a parking of a transport 102 at an event location. The parking processing node 107 may access a device (e.g., a Smartphone) of a transport 102 occupant to determine a transport pickup location and a pickup time based on a conclusion of an event. The parking processing node 107 may detect from the device of the transport occupant a modification of the pickup location and the pickup time made based on updated conclusion of the event and may send a command to move the transport 102 to a location proximate to the event based on the modified pickup location and pickup time. Parking locations of other transport nodes 105 may be taken into consideration.

According to another exemplary embodiment, the destination processing node 107 may receive a notification from a transport 102 regarding a probable vacancy. The destination processing node 107 may determine a probable time of availability and a location of the vacancy based on the notification. The destination processing node 107 may query a plurality of transports 105 in a proximity of the vacancy and may assign the location of the vacancy to a specific transport of the plurality of the transports 105.

According to yet another exemplary embodiment, the transport 102 may query a plurality of transports 105 within a parking area for a parking spot to be vacated. The transport 102 may receive verifications to vacate the parking spots from the plurality of transports 105 within the parking area and may determine locations of the parking spots to be vacated based on the verifications.

The parking processing node 107 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the parking processing node 107 may include multiple processors, multiple cores, or the like, without departing from the scope of the parking processing node 107 system. The parking processing node 107 may also include a non-transitory computer readable medium that may have stored thereon machine-readable instructions executable by the processor 104'.

Figure 1B:
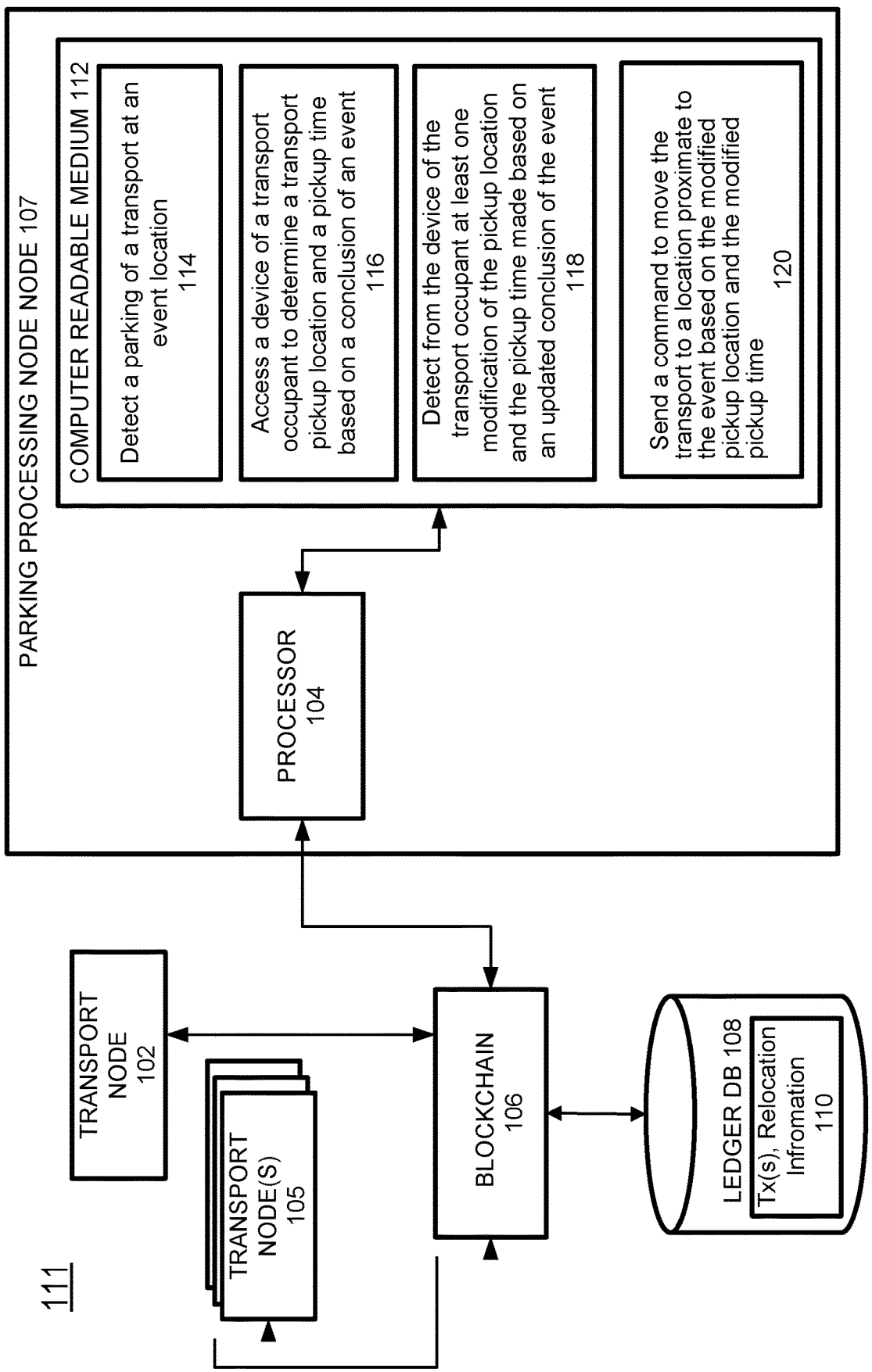
FIG. 1B illustrates an example network diagram including a transport node, according to example embodiments.

FIG. 1B illustrates a network diagram for transport relocation. Referring to FIG. 1B, the network diagram 111 includes a transport node 102 connected to other transport nodes 105 over a blockchain network 106. The transport nodes 102 and 105 may represent transports/vehicles. The blockchain network 106 may have ledger 108 for storing data, such as transport locations and relocation transactions 110 that record the timestamps, and other related data. The transport node 102 may be connected to a parking processing node 107 via the blockchain 106.

While this example describes in detail only one parking processing node 107, multiple such nodes may be connected to the blockchain 106. It should be understood that the parking processing node 107 may include additional components and that some of the components described herein may be removed and/or modified without departing from a scope of the parking processing node 107 disclosed herein. The parking processing node 107 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the parking processing node 107 may include multiple processors, multiple cores, or the like, without departing from the scope of the parking processing node 107 system.

The parking processing node 107 may also include a non-transitory computer readable medium 112 that may have stored thereon machine-readable instructions executable by the processor 104. Examples of the machine-readable instructions are shown as 114-120 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may execute the machine-readable instructions 114 to detect a parking of a transport 102 at an event location. Each of the transports 102 and 105 may serve as a network node on a blockchain network 106. As discussed above, the blockchain ledger 108 may store transport relocation transactions 110. The blockchain 106 network may be configured to use one or more smart contracts that may manage transactions for the participating transport nodes 102 and 105. The parking processing node 107 may provide the transport relocation-related information to the blockchain 106 to be stored on a ledger 108.

The processor 104 may execute the machine-readable instructions 116 to access a device of a transport occupant to determine a transport 102 pickup location and a pickup time based on a conclusion of an event. The processor 104 may execute the machine-readable instructions 118 to detect from the device of the transport 102 occupant at least one modification of the pickup location and the pickup time made based on an updated conclusion of the event. The processor 104 may execute the machine-readable instructions 120 to send a command to move the transport 102 to a location proximate to the event based on the modified pickup location and the modified pickup time.

Figure 1C:
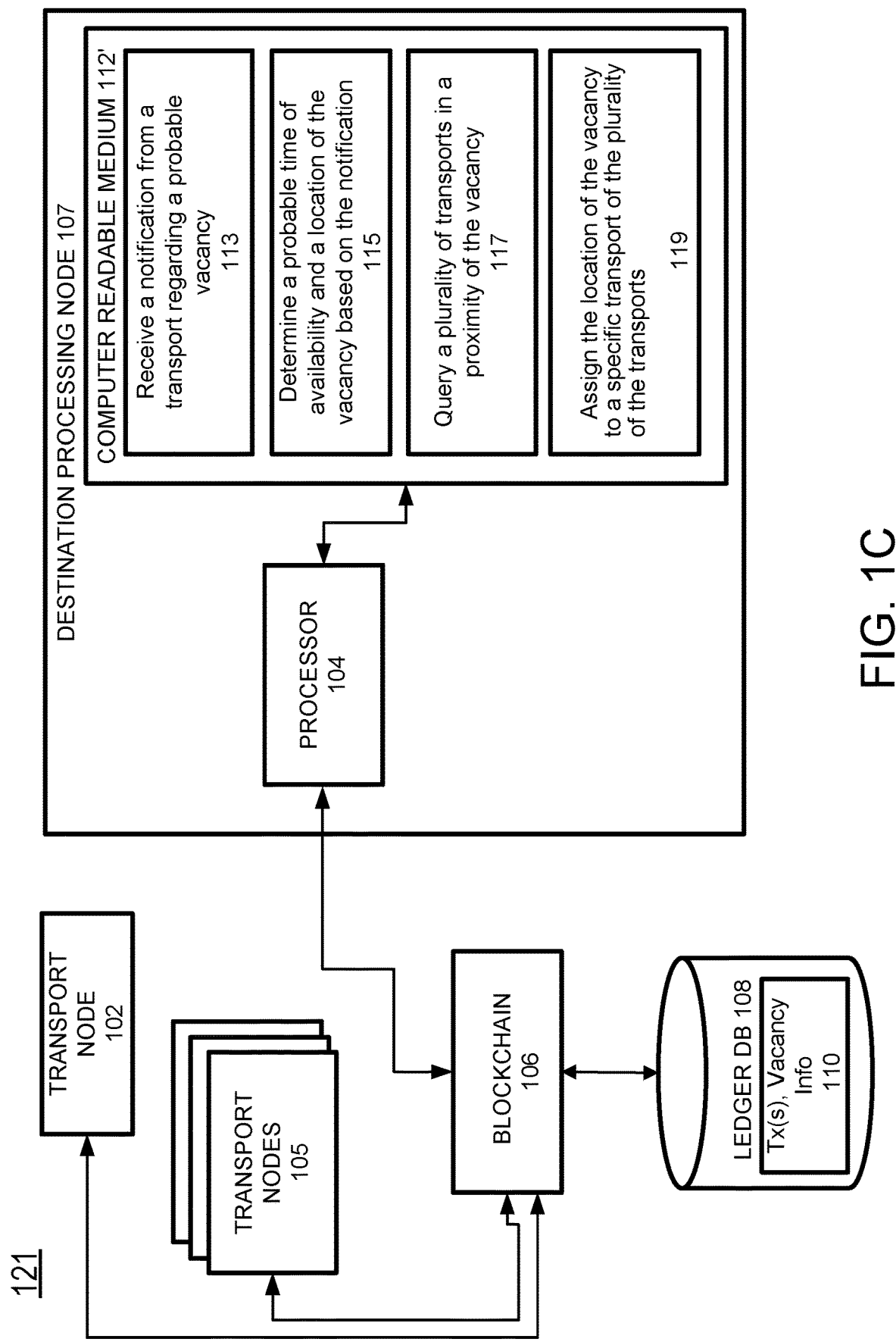
FIG. 1C illustrates another example network diagram including a transport node, according to example embodiments.

FIG. 1C illustrates a network diagram for vacancy processing. Referring to FIG. 1C, the network diagram 121 includes a transport node 102 connected to other transport nodes 105 over a blockchain network 106. The transport nodes 102 and 105 may represent transports/vehicles. The blockchain network 106 may have ledger 108 for storing data, such as transport locations and vacancy-related transactions 110 that record the timestamps, and other related data. The transport node 102 may be connected to a destination processing node 107 via the blockchain 106.

While this example describes in detail only one destination processing node 107, multiple such nodes may be connected to the blockchain 106. It should be understood that the destination processing node 107 may include additional components and that some of the components described herein may be removed and/or modified without departing from a scope of the destination processing node 107 disclosed herein. The destination processing node 107 may have a computing device or a server computer, or the like, and may include a processor 104', which may be a semiconductor-based microprocessor, a central processing unit (CPU), an application specific integrated circuit (ASIC), a field-programmable gate array (FPGA), and/or another hardware device. Although a single processor 104 is depicted, it should be understood that the destination processing node 107 may include multiple processors, multiple cores, or the like, without departing from the scope of the destination processing node 107 system.

The destination processing node 107 may also include a non-transitory computer readable medium 112' that may have stored thereon machine-readable instructions executable by the processor 104. Examples of the machine-readable instructions are shown as 113-119 and are further discussed below. Examples of the non-transitory computer readable medium 112' may include an electronic, magnetic, optical, or other physical storage device that contains or stores executable instructions. For example, the non-transitory computer readable medium 112' may be a Random Access memory (RAM), an Electrically Erasable Programmable Read-Only Memory (EEPROM), a hard disk, an optical disc, or other type of storage device.

The processor 104 may execute the machine-readable instructions 113 to receive a notification from a transport 102 regarding a probable vacancy. Each of the transports 102 and 105 may serve as a network node on a blockchain network 106. As discussed above, the blockchain ledger 108 may store vacancy-related transactions 110. The blockchain 106 network may be configured to use one or more smart contracts that may manage transactions for the participating transport nodes 102 and 105. The destination processing node 107 may provide the vacancy-related information to the blockchain 106 to be stored on a ledger 108.

The processor 104 may execute the machine-readable instructions 115 to determine a probable time of availability and a location of the vacancy based on the notification. The processor 104 may execute the machine-readable instructions 117 to query a plurality of transports 105 in a proximity of the vacancy. The processor 104 may execute the machine-readable instructions 119 to assign the location of the vacancy to a specific transport of the plurality of the transports 105.

Figure 1D:
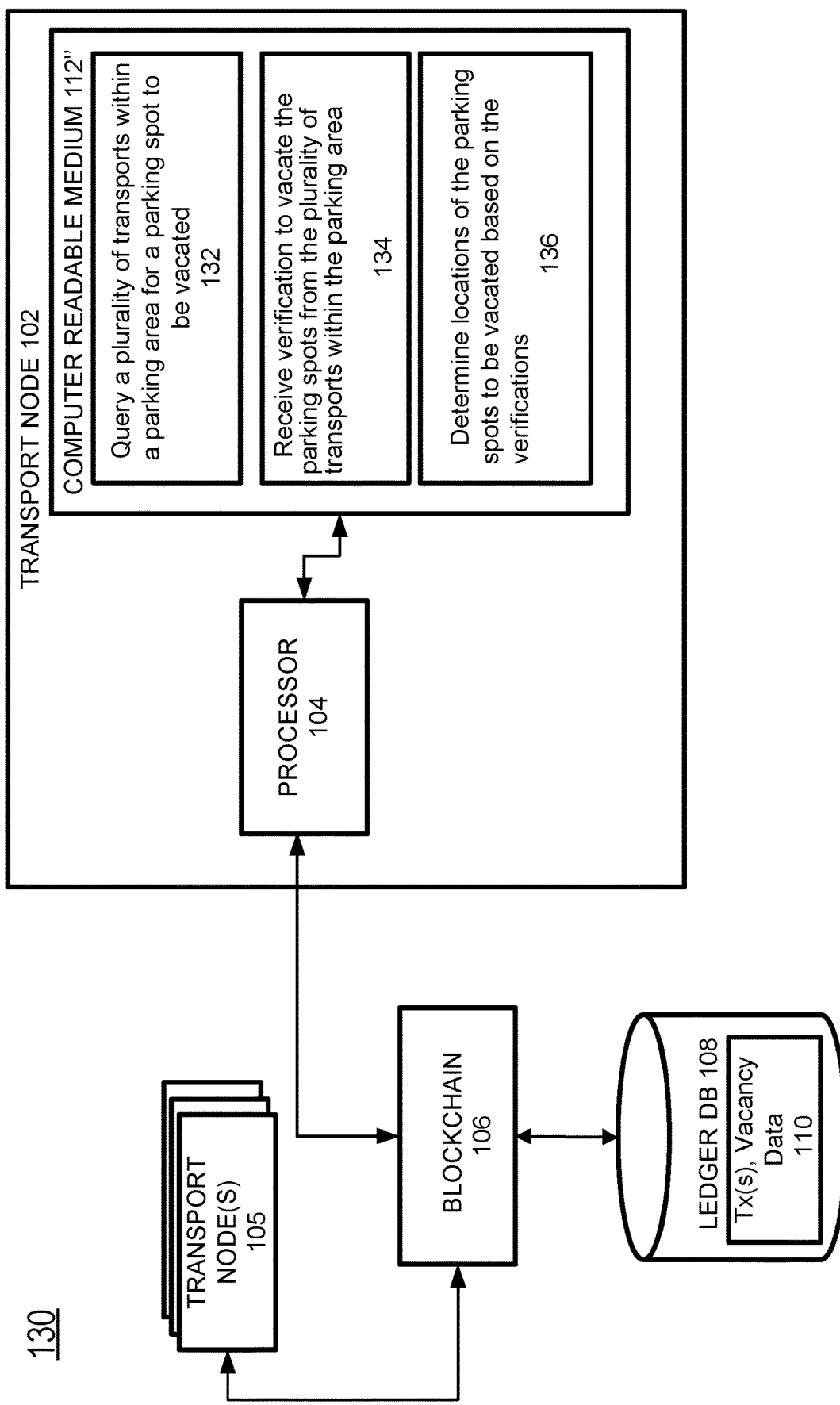
FIG. 1D illustrates another example network diagram including a transport node, according to example embodiments.

FIG. 1D illustrates a network diagram for locating a vacant parking spot by at transport. Referring to FIG. 1D, the network diagram 130 includes a transport node 102 (e.g., a vehicle) connected to other transport nodes 105 over a blockchain network 106 that has a ledger 108 for storing parking vacancy information and transactions 110. The transport nodes 105 may also serve as blockchain 106 peers. While this example describes in detail only one transport node 102, multiple such nodes may be connected to the blockchain 106. It should be understood that the transport node 102 may include additional components and that some of the components described herein may be removed and/or modified without departing from a scope of the transport node 102 disclosed herein. The transport node 102 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the transport node 102 may include multiple processors, multiple cores, or the like, without departing from the scope of the transport node 102.

The transport node 102 may also include a non-transitory computer readable medium 112" that may have stored thereon machine-readable instructions executable by the processor 104. Examples of the machine-readable instructions are shown as 121-125 and are further discussed below. Examples of the non-transitory computer readable medium 112" may include an electronic, magnetic, optical, or other physical storage device that contains or stores executable instructions. For example, the non-transitory computer readable medium 112" may be a Random Access memory (RAM), an Electrically Erasable Programmable Read-Only Memory (EEPROM), a hard disk, an optical disc, or other type of storage device.

The processor 104 may execute the machine-readable instructions 132 to query a plurality of transports 105 within a parking area for a parking spot to be vacated. The blockchain 106 may be configured to use one or more smart contracts that manage transactions for multiple participating nodes 105. The transport node 102 may provide vacancy information to the blockchain 106 and this transaction may be stored on the ledger 108.

The processor 104 may execute the machine-readable instructions 134 to receive verification to vacate the parking spots from the plurality of transports within the parking area. The processor 104 may execute the machine-readable instructions 136 to determine locations of the parking spots to be vacated based on the verifications.

Figure 2A:
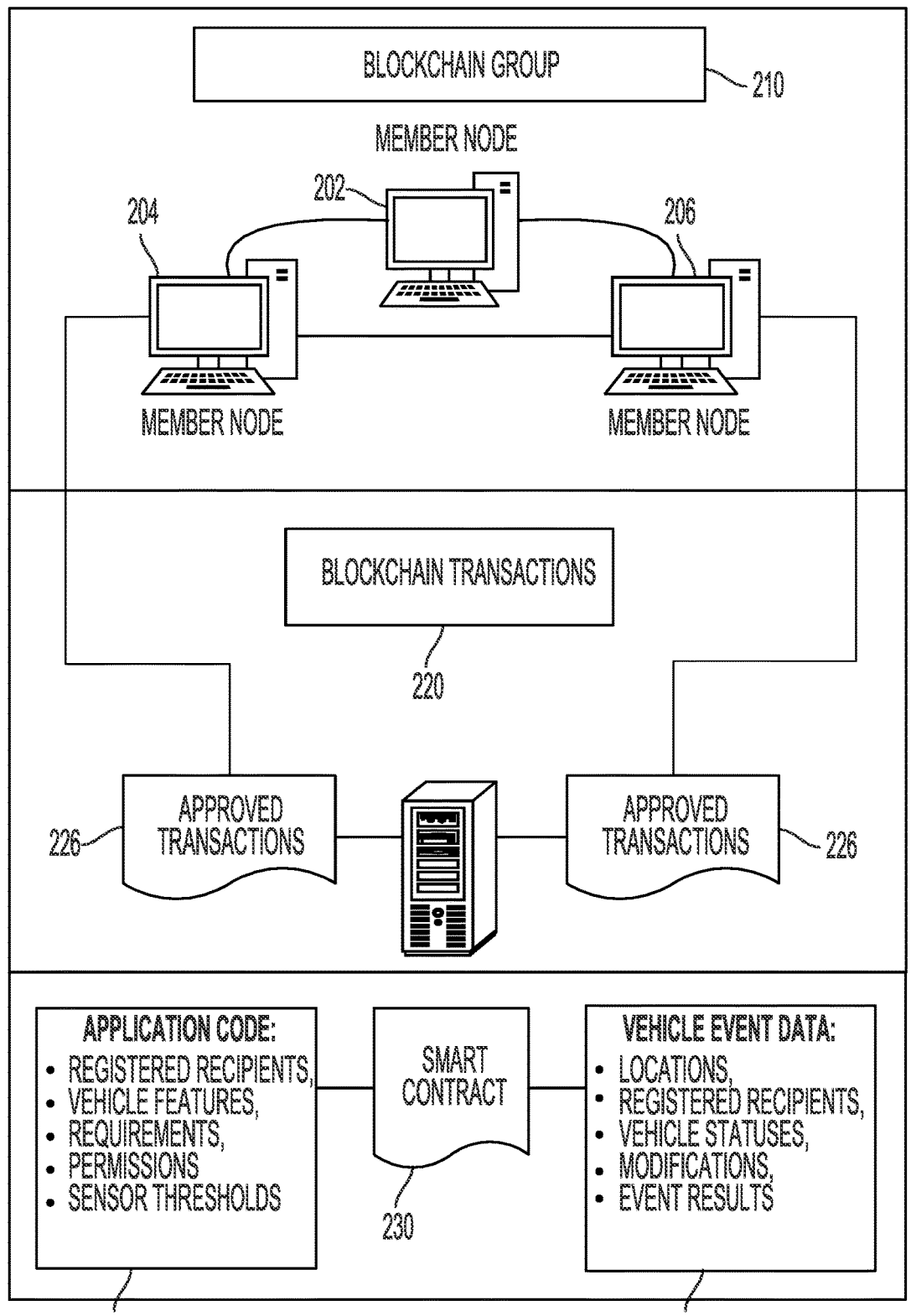
FIG. 2A illustrates a blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a blockchain group 210. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 220 are stored in memory of computers as the transactions are received and approved by the consensus model dictated by the members' nodes. Approved transactions 226 are stored in current blocks of the blockchain and committed to the blockchain via a committal procedure, which includes performing a hash of the data contents of the transactions in a current block and referencing a previous hash of a previous block. Within the blockchain, one or more smart contracts 230 may exist that define the terms of transaction agreements and actions included in smart contract executable application code 232, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time. Then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 234, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 230, which are then stored in a blockchain. For example, sensor thresholds stored in the smart contract can be used as the basis for whether a detected service is necessary and when and where the service should be performed.

Figure 2B:
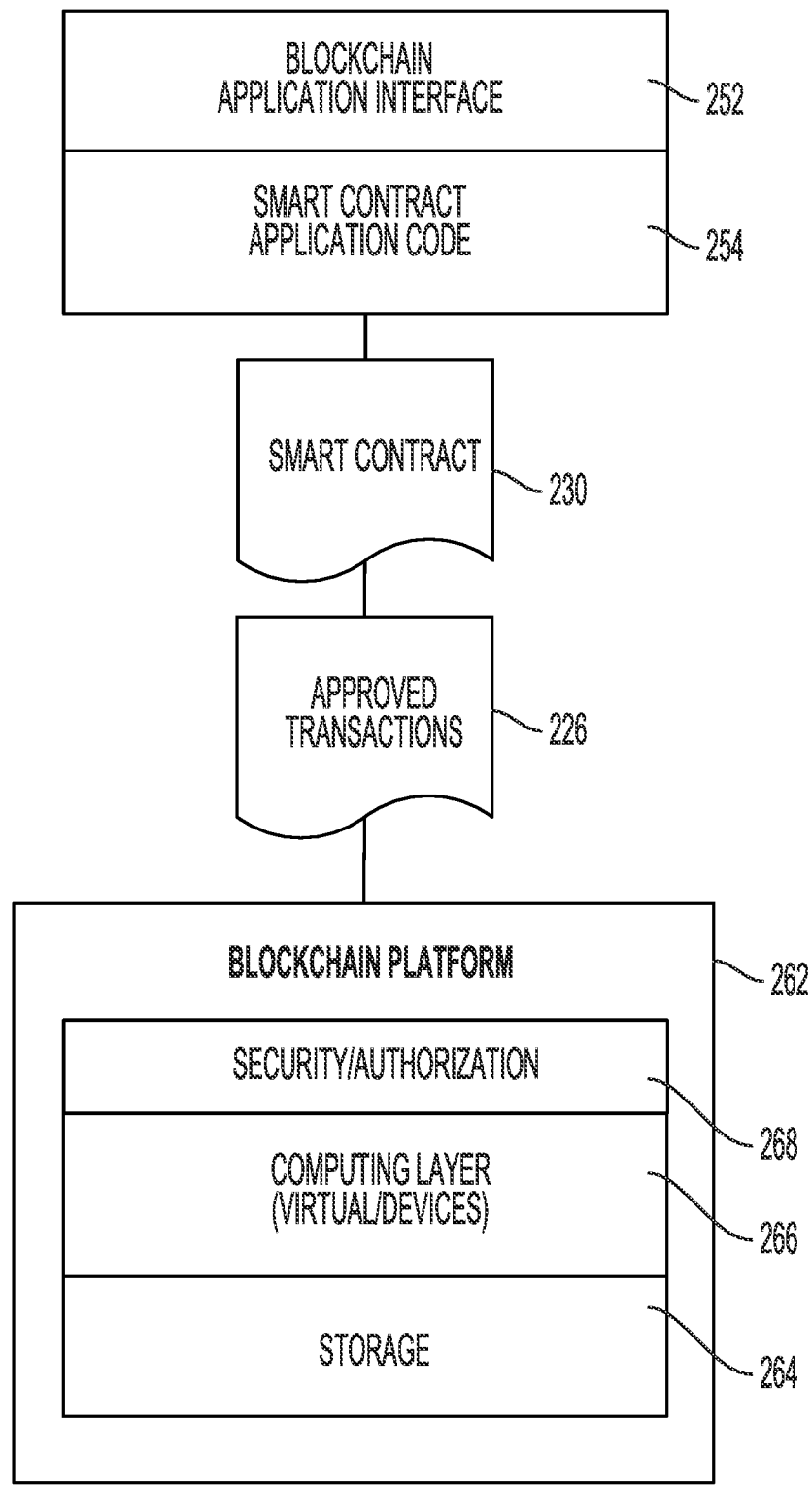
FIG. 2B illustrates another blockchain configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices, which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code, which is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 2C:
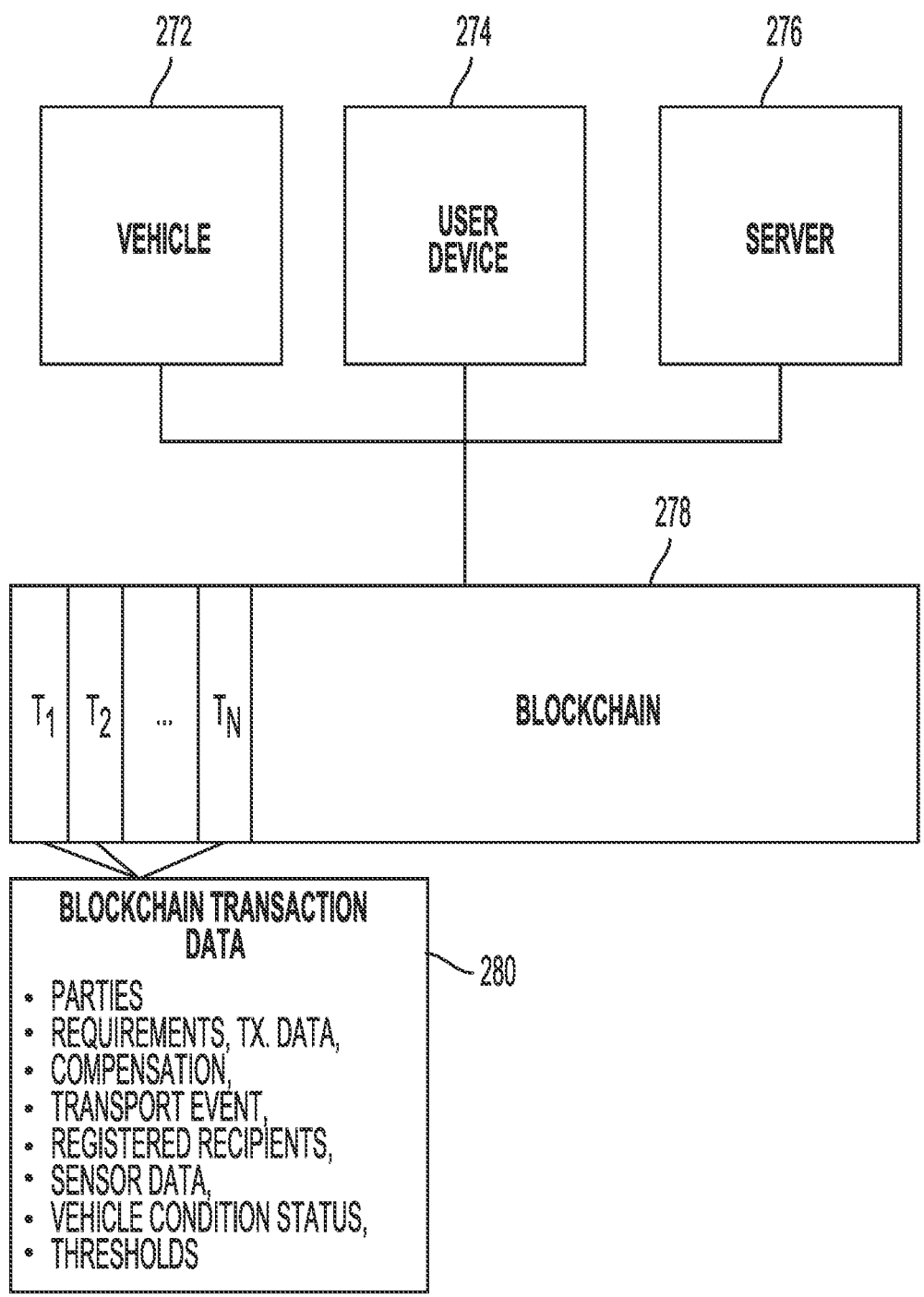
FIG. 2C illustrates a blockchain configuration for storing blockchain transaction data, according to example embodiments.

FIG. 2C illustrates a blockchain configuration for storing blockchain transaction data, according to example embodiments. Referring to FIG. 2C, the example configuration 270 provides for the vehicle 272, the user device 274 and a server 276 sharing information with a distributed ledger (i.e., blockchain) 278. The server may represent a service provider entity inquiring with a vehicle service provider to share user profile rating information in the event that a known and established user profile is attempting to rent a vehicle with an established rated profile. The server 276 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 280 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 3A:
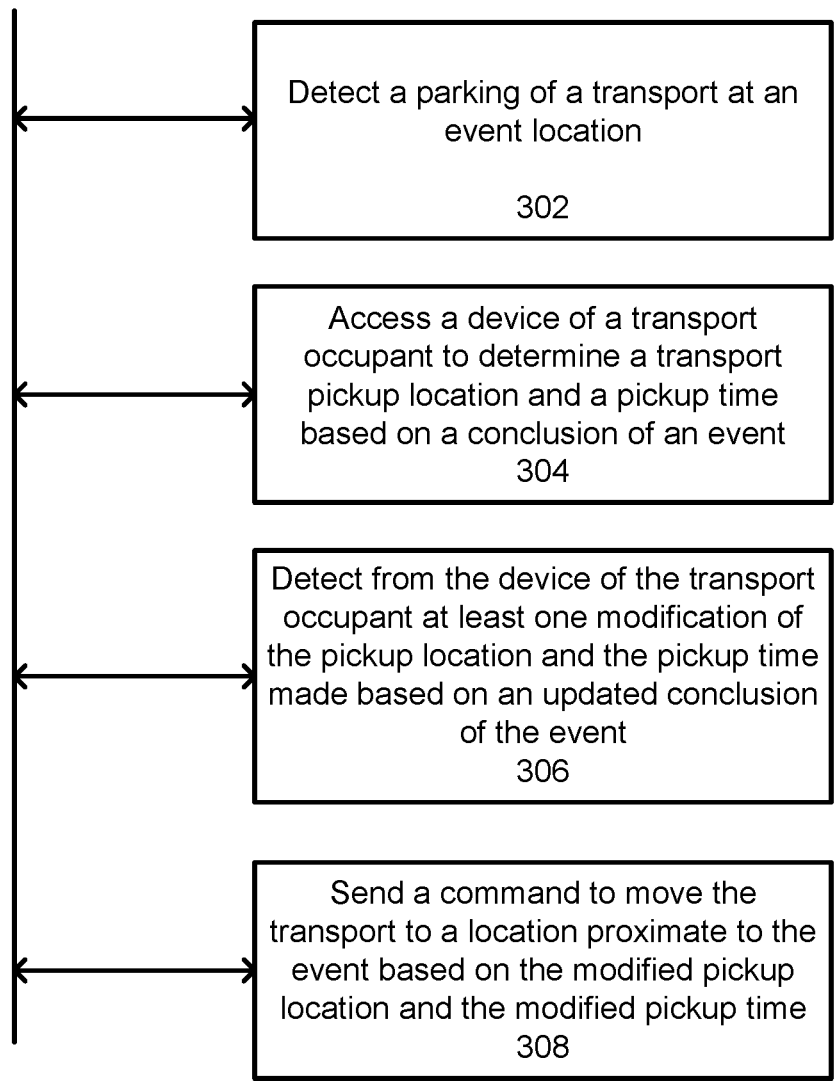
FIG. 3A illustrates a flow diagram, according to example embodiments.

FIG. 3A illustrates a flow diagram 300, according to example embodiments. Referring to FIG. 3A, an example method may be executed by the parking processing node 107 (see FIG. 1B). It should be understood that method 300 depicted in FIG. 3A may include additional operations and that some of the operations described therein may be removed and/or modified without departing from the scope of the method 300. The description of the method 300 is also made with reference to the features depicted in FIG. 1B for purposes of illustration. Particularly, the processor 104 of the parking processing node 107 may execute some or all of the operations included in the method 300.

With reference to FIG. 3A, at block 302, the processor 104' may detect a parking of a transport at an event location. At block 304, the processor 104' may access a device of a transport occupant to determine a transport pickup location and a pickup time based on a conclusion of an event. At block 306, the processor 104' may detect from the device of the transport occupant at least one modification of the pickup location and the pickup time made based on an updated conclusion of the event. At block 308, the processor 104' may send a command to move the transport to a location proximate to the event based on the modified pickup location and the modified pickup time.

Figure 3B:
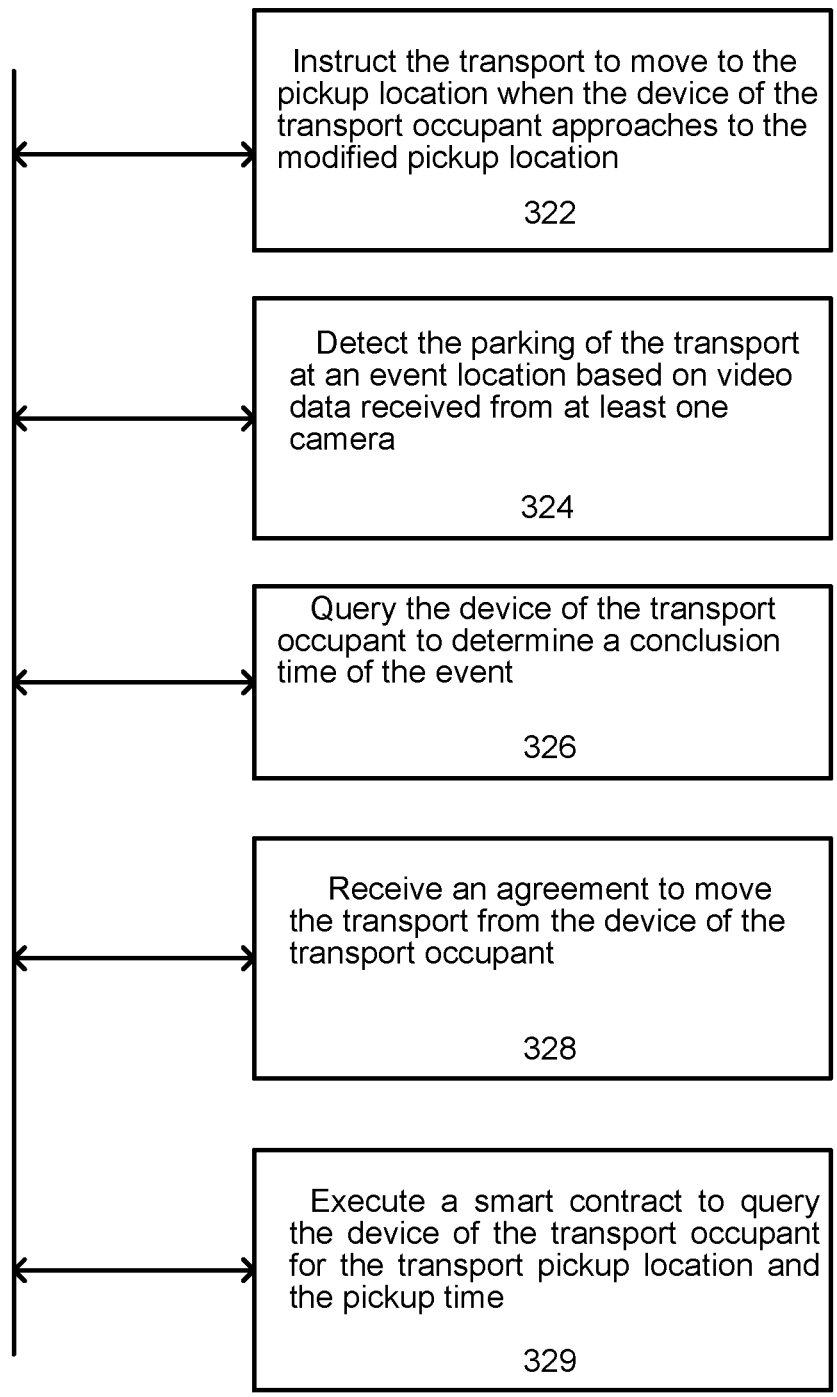
FIG. 3B illustrates another flow diagram, according to example embodiments.

FIG. 3B illustrates a flow diagram 320 of an example method, according to example embodiments. Referring to FIG. 3B, the method 320 may also include one or more of the following steps. At block 322, the processor 104' may instruct the transport to move to the pickup location when the device of the transport occupant approaches to the modified pickup location. At block 324, the processor 104' may detect the parking of the transport at an event location based on video data received from at least one camera. At block 326, the processor 104' may query the device of the transport occupant to determine a conclusion time of the event. At block 328, the processor 104' may receive an agreement to move the transport from the device of the transport occupant. Note that the agreement may constitute a consensus of a blockchain. At block 329, the processor 104' may execute a smart contract to query the device of the transport occupant for the transport pickup location and the pickup time.

Figure 3C:
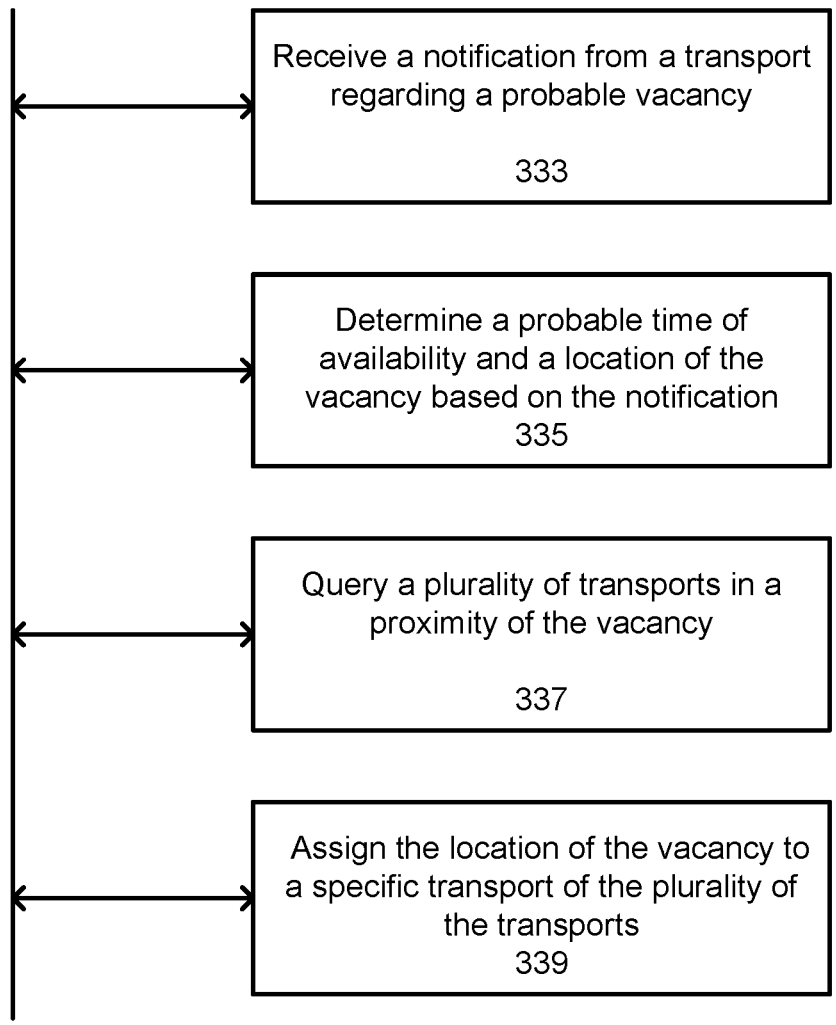
FIG. 3C illustrates a further flow diagram, according to example embodiments.

FIG. 3C illustrates a flow diagram 330, according to example embodiments. Referring to FIG. 3C, an example method may be executed by the destination processing node 107 (see FIG. 1C). It should be understood that method 330 depicted in FIG. 3C may include additional operations and that some of the operations described therein may be removed and/or modified without departing from the scope of the method 330. The description of the method 330 is also made with reference to the features depicted in FIG. 1C for purposes of illustration. Particularly, the processor 104 of destination processing node 107 may execute some or all of the operations included in the method 330.

With reference to FIG. 3C, at block 333, the processor 104' may receive a notification from a transport regarding a probable vacancy. At block 335, the processor 104' may determine a probable time of availability and a location of the vacancy based on the notification. At block 337, the processor 104' may query a plurality of transports in a proximity of the vacancy. At block 339, the processor 104 may assign the location of the vacancy to a specific transport of the plurality of the transports.

Figure 3D:
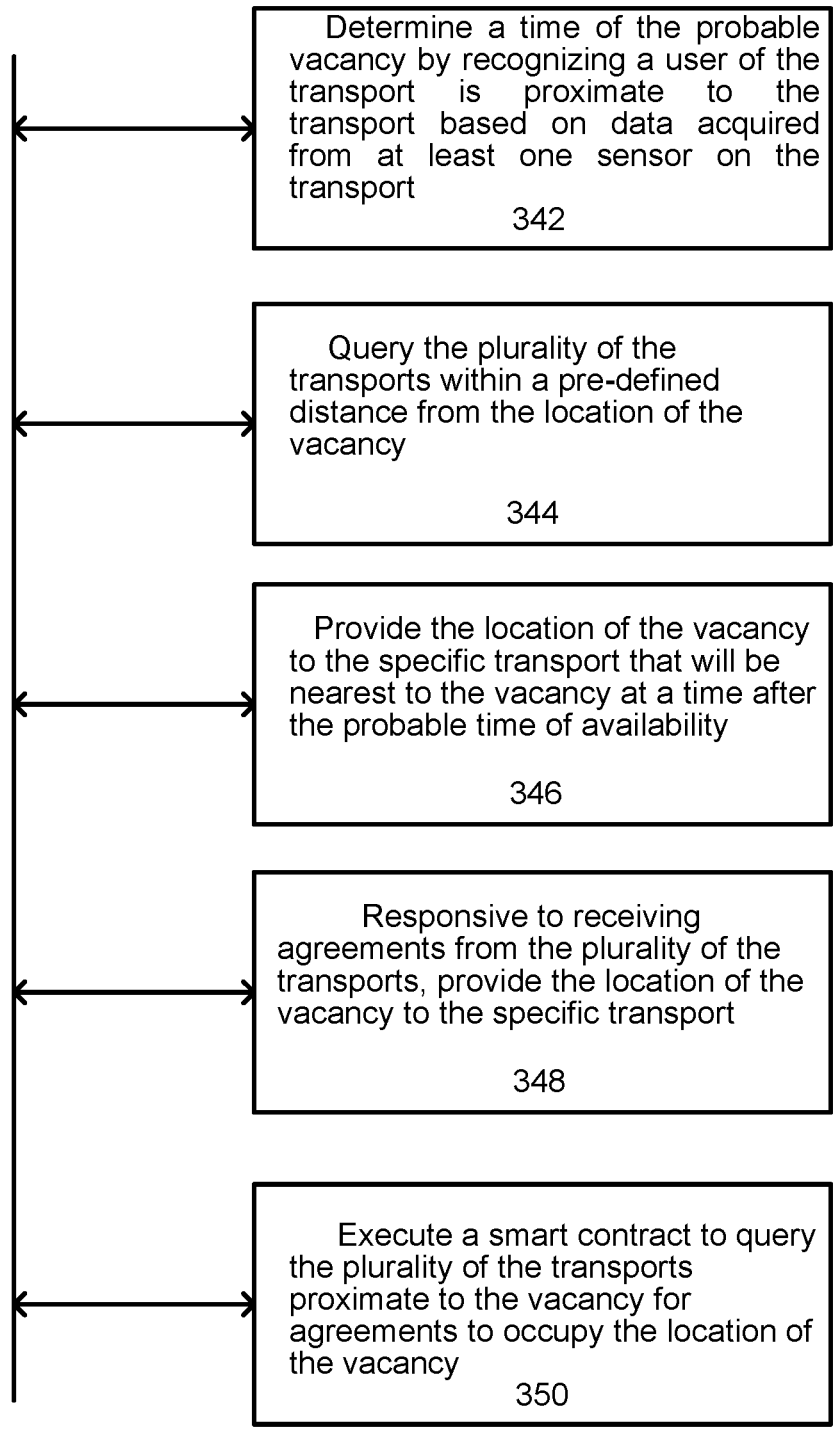
FIG. 3D illustrates yet a further flow diagram, according to example embodiments.

FIG. 3D illustrates a flow diagram 340 of an example method, according to example embodiments. Referring to FIG. 3D, the method 342 may also include one or more of the following steps. At block 342, the processor 104 may determine a time of the probable vacancy by recognizing a user of the transport is proximate to the transport based on data acquired from at least one sensor on the transport. At block 344, the processor 104 may query the plurality of the transports within a pre-defined distance from the location of the vacancy. At block 346, the processor 104 may provide the location of the vacancy to the specific transport that will be nearest to the vacancy at a time after the probable time of availability. At block 348, the processor 104 may, responsive to receiving agreements from the plurality of the transports, provide the location of the vacancy to the specific transport. Note that the plurality of the transports may be associated with a blockchain consensus. At block 350, the processor 104 may execute a smart contract to query the plurality of the transports proximate to the vacancy for agreements to occupy the location of the vacancy.

Figure 3E:
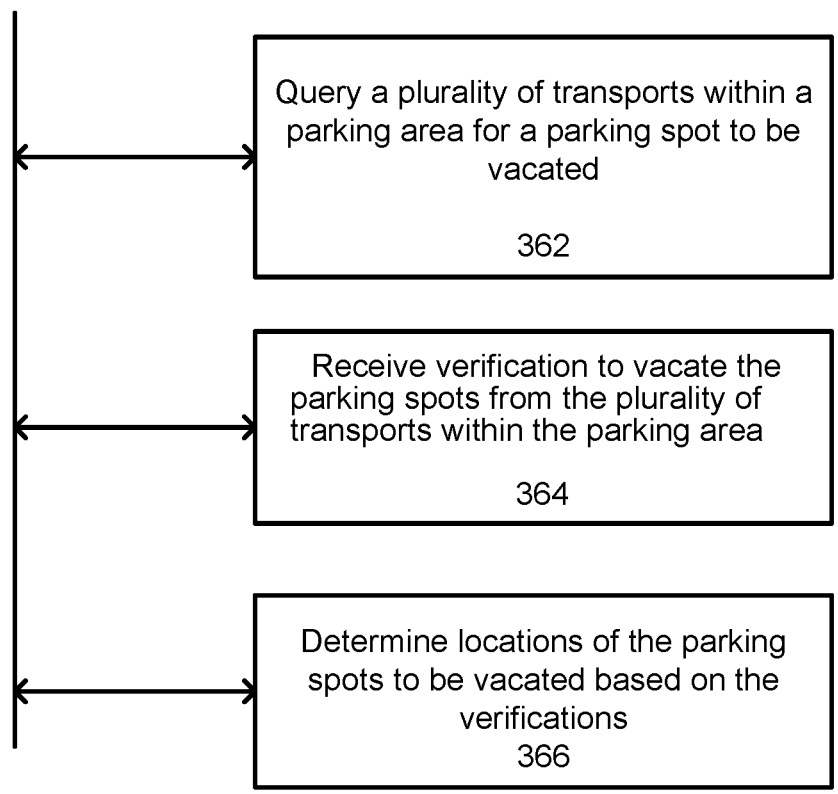
FIG. 3E illustrates a further flow diagram, according to example embodiments.

FIG. 3E illustrates a flow diagram 360, according to example embodiments. Referring to FIG. 3E, an example method may be executed by the transport node 102 (see FIG. 1D). It should be understood that method 360 depicted in FIG. 3E may include additional operations and that some of the operations described therein may be removed and/or modified without departing from the scope of the method 360. The description of the method 360 is also made with reference to the features depicted in FIG. 1D for purposes of illustration. Particularly, the processor 104 of the transport node 102 may execute some or all of the operations included in the method 360.

With reference to FIG. 3E, at block 362, the processor 104 may query a plurality of transports within a parking area for a parking spot to be vacated. At block 364, the processor 104 may receive verification to vacate the parking spots from the plurality of transports within the parking area. At block 366, the processor 104 may determine locations of the parking spots to be vacated based on the verifications.

Figure 3F:
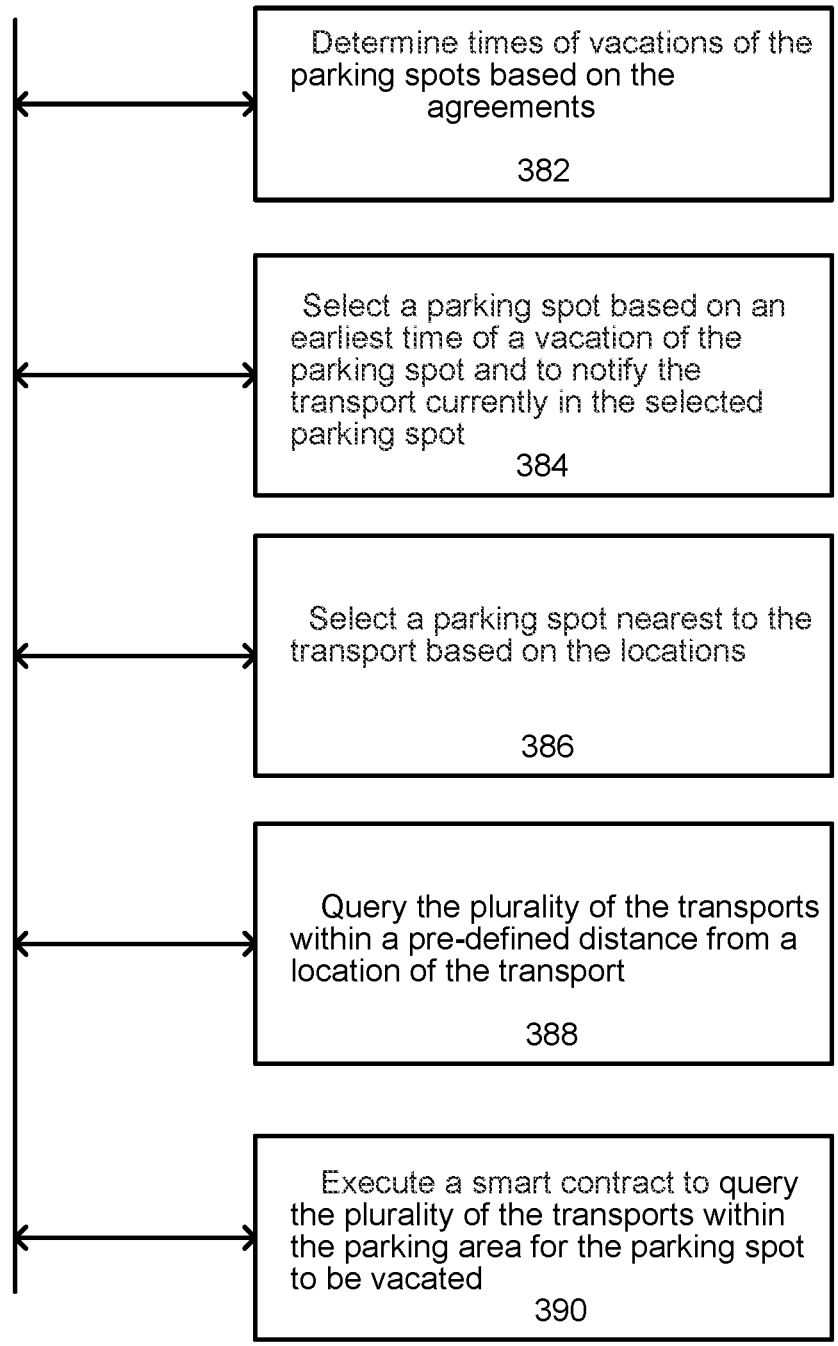
FIG. 3F illustrates yet a further flow diagram, according to example embodiments.

FIG. 3F illustrates a flow diagram 380 of an example method, according to example embodiments. Referring to FIG. 3F, the method 380 may also include one or more of the following steps. At block 382, the processor 104 may determine times of vacations of the parking spots based on the agreements. At block 384, the processor 104 may select a parking spot based on an earliest time of a vacation of the parking spot and to notify the transport currently in the selected parking spot. At block 386, the processor 104 may select a parking spot nearest to the transport based on the locations. At block 388, the processor 104 may query the plurality of the transports within a pre-defined distance from a location of the transport. Note that the verifications may represent a blockchain consensus among the transports. At block 390, the processor 104 may execute a smart contract to query the plurality of the transports within the parking area for the parking spot to be vacated.

Figure 4A:
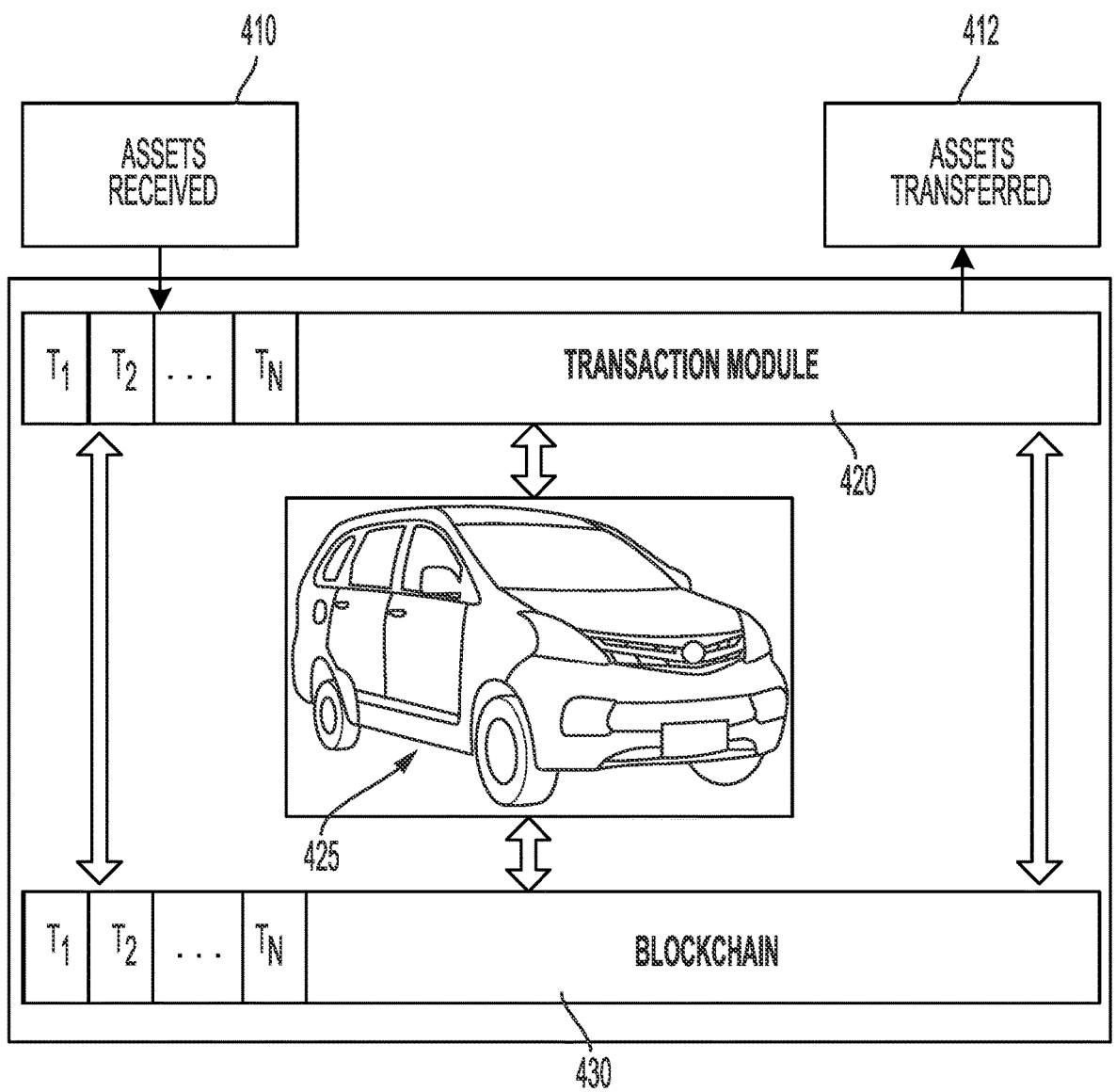
FIG. 4A illustrates an example blockchain vehicle configuration for managing blockchain transactions associated with a vehicle, according to example embodiments.

FIG. 4A illustrates an example blockchain vehicle configuration 400 for managing blockchain transactions associated with a vehicle, according to example embodiments. Referring to FIG. 4A, as a particular transport/vehicle 425 is engaged in transactions, such as asset transfer transactions (e.g., access key exchanges, vehicle service, dealer transactions, delivery/pickup, transportation services, etc.). The vehicle 425 may receive assets 410 and/or expel/transfer assets 412 according to a transaction(s) defined by smart contracts. The transaction module 420 may record information, such as parties, credits, service descriptions, date, time, location, results, notifications, unexpected events, etc. Those transactions in the transaction module 420 may be replicated into a blockchain 430, which may be managed by a remote server and/or by a remote blockchain peers, among which the vehicle 425 itself may represent a blockchain member and/or blockchain peer. In other embodiments, the blockchain 430 resides on the vehicle 425. The assets received and/or transferred can be based on location and consensus as described herein.

Figure 4B:
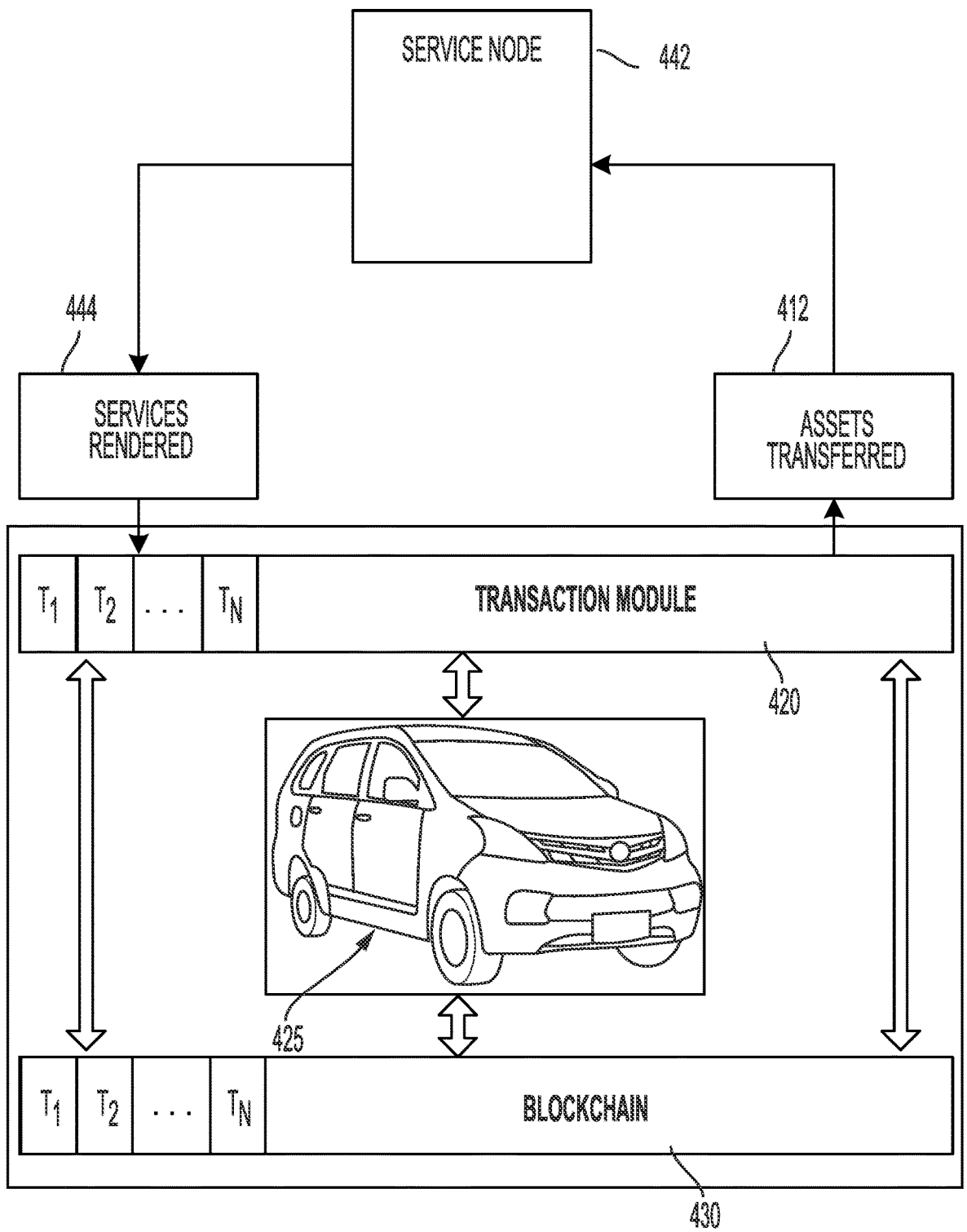
FIG. 4B illustrates another example blockchain vehicle configuration for managing blockchain transactions between a service center and a vehicle, according to example embodiments.

FIG. 4B illustrates an example blockchain vehicle configuration 440 for managing blockchain transactions between a service node (e.g., a gas station, a service center, a body shop, a rental center, automotive dealer, local service stop, delivery pickup center, etc.) and a vehicle, according to example embodiments. In this example, the vehicle 425 may have driven itself to a service node 442, because the vehicle needs service and/or needs to stop at a particular location. The service node 442 may perform a service (e.g., pump gas) or may register the vehicle 425 for a service call at a particular time, with a particular strategy, such as oil change, battery charge or replacement, tire change or replacement, and any other transport related service. The services rendered 444 may be performed based on a smart contract, which is downloaded from or accessed via the blockchain 430 and identified for permission to perform such services for a particular rate of exchange. The services may be logged in the transaction log of the transaction module 420, the credits 412 are transferred to the service center 442 and the blockchain may log transactions to represent all the information regarding the recent service. In other embodiments, the blockchain 430 resides on the vehicle 425 and/or the service center server. In one example, a transport event may require a refuel or other vehicle service and the occupants may then be responsible for the asset value increase for such service. The service may be rendered via a blockchain notification, which is then used to redistribute the asset value to the occupants via their respective asset values. Responsibility for the service center activities can be based on asset transfer as described herein.

Figure 4C:
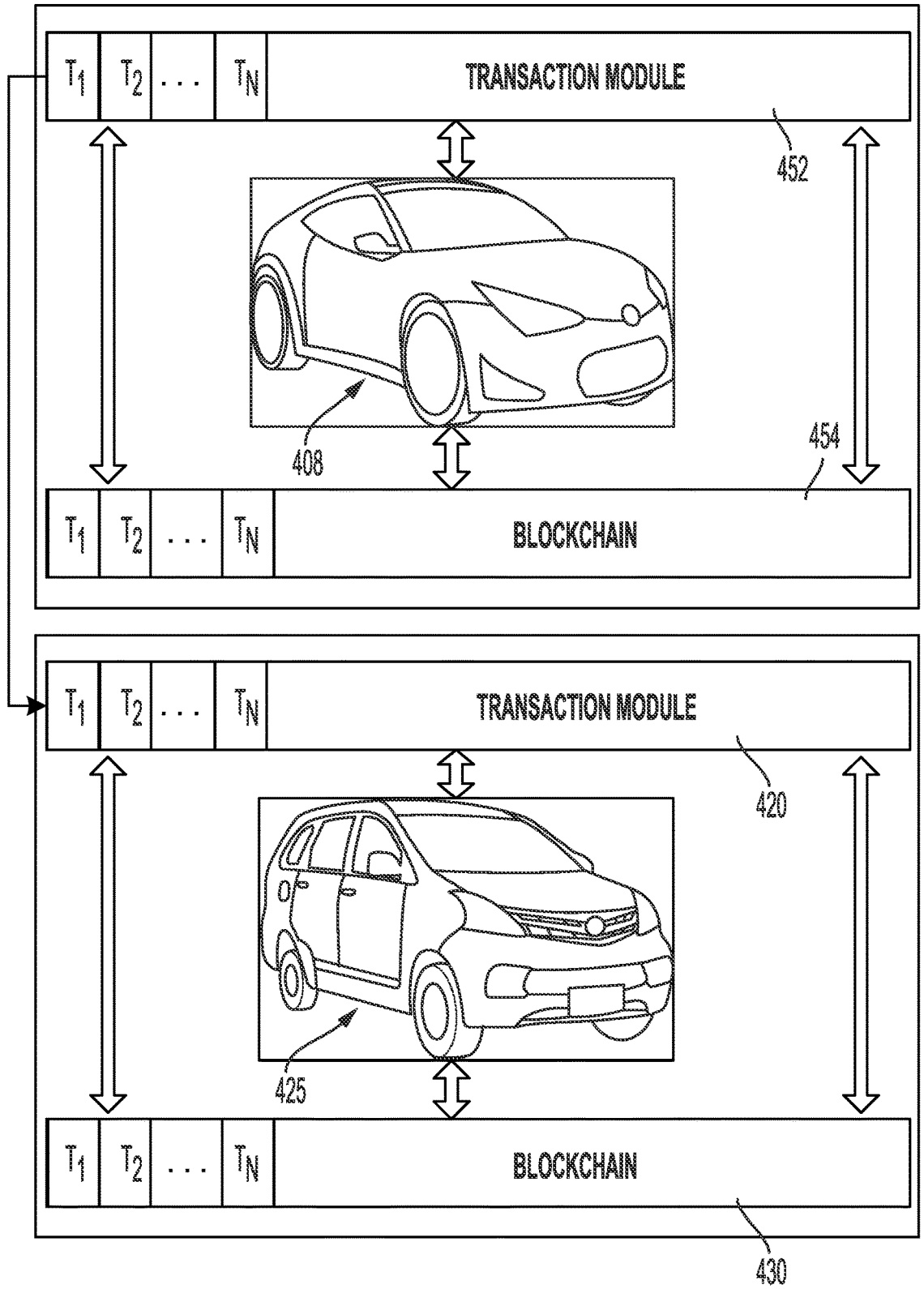
FIG. 4C illustrates yet another example blockchain vehicle configuration for managing blockchain transactions conducted among various vehicles, according to example embodiments

FIG. 4C illustrates an example blockchain vehicle configuration 450 for managing blockchain transactions conducted among various vehicles, according to the exemplary embodiments. The vehicle 425 may engage with another vehicle 408 to perform various actions such as to share access keys, transfer keys, acquire service calls, etc. when the vehicle has reached a status where the assets need to be shared with another vehicle. For example, the vehicle 408 may be due for a battery charge and/or may have an issue with a tire and may be in route to pick up a package for delivery. The vehicle 408 may notify another vehicle 425 which is in its network and which operates on its blockchain member service. The vehicle 425 may then receive the information via a wireless communication request to perform the package pickup from the vehicle 408 and/or from a server (not shown). The transactions are logged in the transaction modules 452 and 420 of both vehicles. The assets are transferred from vehicle 408 to vehicle 425 and the record of the asset transfer is logged in the blockchain 430/454 assuming that the blockchains are different from one another, or, are logged in the same blockchain used by all members. Responsibility for the transferred assets can be based on asset values (e.g., access keys) as described herein.

Figure 5:
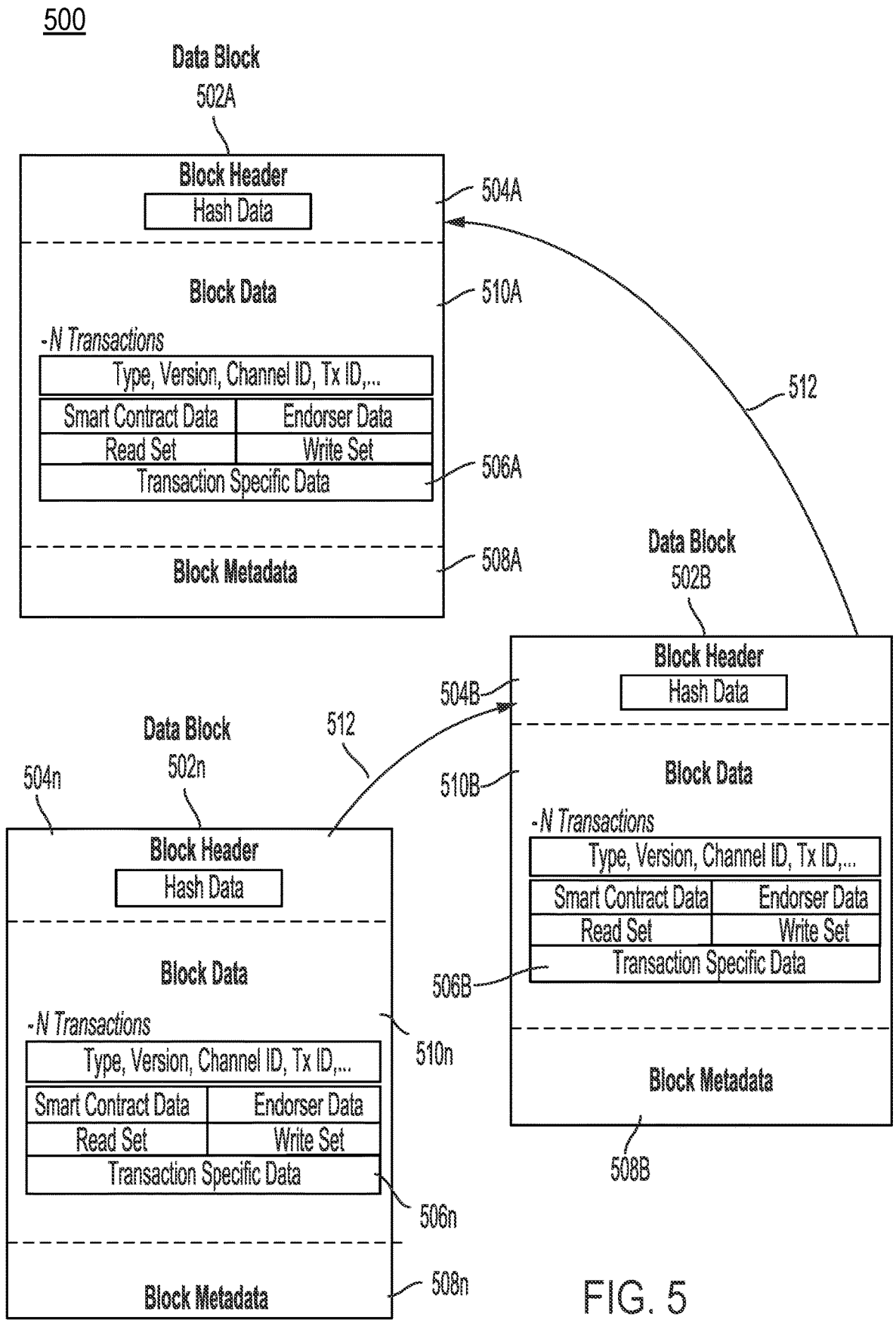
FIG. 5 illustrates example data blocks, according to example embodiments.

FIG. 5 illustrates blockchain blocks 500 that can be added to a distributed ledger, according to example embodiments, and contents of block structures 502A to 502n. Referring to FIG. 5, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 602A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a crypto-currency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 5, a block 502A (also referred to as a data block) that is stored on the blockchain and/or the distributed ledger may include multiple data segments such as a block header 504A to 504n, transaction specific data 506A to 506n, and block metadata 508A to 508n. It should be appreciated that the various depicted blocks and their contents, such as block 502A and its contents are merely for purposes of an example and are not meant to limit the scope of the example embodiments. In some cases, both the block header 504A and the block metadata 508A may be smaller than the transaction specific data 506A which stores entry data; however, this is not a requirement. The block 502A may store transactional information of N entries (e.g., 100, 500, 1000, 2000, 3000, etc.) within the block data 510A to 510n. The block 502A may also include a link to a previous block (e.g., on the blockchain) within the block header 504A. In particular, the block header 504A may include a hash of a previous block's header. The block header 504A may also include a unique block number, a hash of the block data 510A of the current block 502A, and the like. The block number of the block 502A may be unique and assigned in an incremental/sequential order starting from zero. The first block in the blockchain may be referred to as a genesis block which includes information about the blockchain, its members, the data stored therein, etc.

The block data 510A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 510A may also store transaction specific data 506A which adds additional information to the hash-linked chain of blocks in the blockchain. Accordingly, the data 506A can be stored in an immutable log of blocks on the distributed ledger. Some of the benefits of storing such data 506A are reflected in the various embodiments disclosed and depicted herein. The block metadata 508A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 510A and a validation code identifying whether an entry was valid/invalid.

The other blocks 502B to 502n in the blockchain also have headers, files, and values. However, unlike the first block 502A, each of the headers 504A to 504n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 512, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
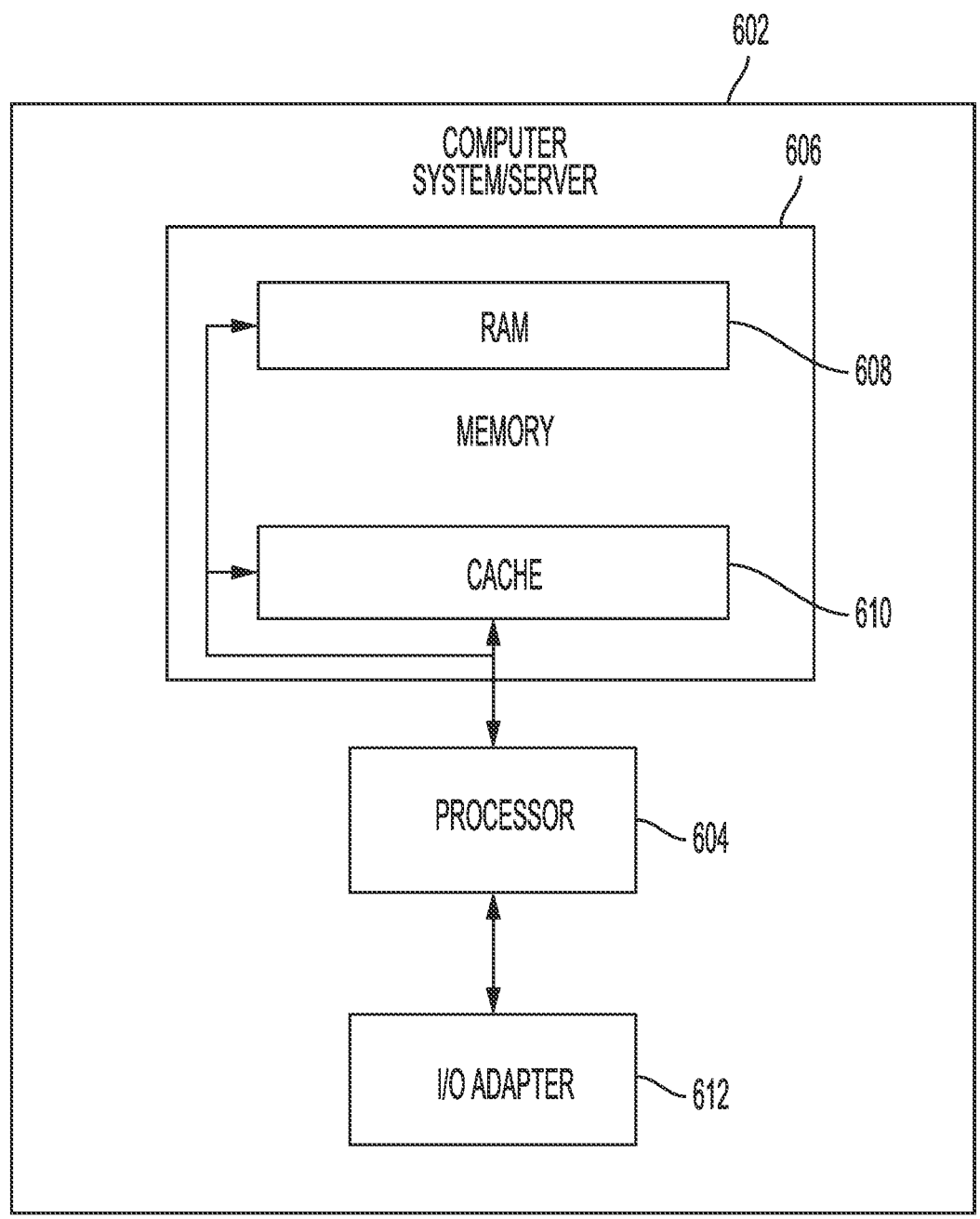
FIG. 6 illustrates an example system that supports one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 608 and/or cache memory 610. Computer system/server 602 may further include other removable/non-removable, volatile/non-volatile computer system storage media. By way of example only, memory 606 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility, having a set (at least one) of program modules, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices via an I/O adapter 612, such as a keyboard, a pointing device, a display, etc.; one or more devices that enable a user to interact with computer system/server 602; and/or any devices (e.g., network card, modem, etc.) that enable computer system/server 602 to communicate with one or more other computing devices. Such communication can occur via I/O interfaces of the adapter 612. Still yet, computer system/server 602 can communicate with one or more networks such as a local area network (LAN), a general wide area network (WAN), and/or a public network (e.g., the Internet) via a network adapter. As depicted, adapter 612 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    detecting, by a processing node, a parking of a transport at a location associated with an event;
    determining, by the processing node, a pickup location and a pickup time of the transport based on a conclusion of the event;
    determining, by the processing node, a modified pickup time by the transport based on the conclusion of the event; and
    responsive to the modified pickup time, moving the transport to an intermediate location between the location of the parked transport and a modified pickup location based on the modified pickup time.

2. The method of claim 1, comprising moving the transport to the modified pickup location when a device associated with the transport approaches the modified pickup location.

3. The method of claim 1, comprising detecting the parking of the transport at the location based on video data received from at least one camera.

4. The method of claim 1, comprising detecting the parking of the transport at the location based on a change in transport operation status.

5. The method of claim 1, comprising detecting the parking of the transport at the location based on a transport sensor indicating an occupant of the transport has exited the transport.

6. The method of claim 1, comprising receiving an agreement to move the transport from a device associated with a transport.

7. The method of claim 1, comprising determining the intermediate location based on one or more vehicles vacating a parking spot between the location of the parked transport and the modified pickup location.

8. A system, comprising:
    a processor of a parking processing node;
    a memory on which are stored machine readable instructions that when executed by the processor, cause the processor to:
        detect, by a processing node, a parking of a transport at a location associated with an event;
        determine, by the processing node, a pickup location and a pickup time of the transport based on a conclusion of the event;
        determine, by the processing node, a modified pickup time by the transport based on the conclusion of the event; and
        responsive to the modified pickup time, move the transport to an intermediate location between the location of the parked transport and a modified pickup location based on the modified pickup time.

9. The system of claim 8, wherein the instructions are further to cause the processor to instruct the transport to move the transport to the modified pickup location when a device associated with the transport approaches the modified pickup location.

10. The system of claim 8, wherein the instructions are further to cause the processor to detect the parking of the transport at the event location based on video data received from at least one camera.

11. The system of claim 8, wherein the instructions are further to cause the processor to detect the parking of the transport at the location based on a change in transport operation status.

12. The system of claim 8, wherein the instructions are further to cause the processor to detect the parking of the transport at the location based on a transport sensor indicating an occupant of the transport has exited the transport.

13. The system of claim 8, wherein the instructions are further to cause the processor to receive an agreement to move the transport from a device associated with a transport.

14. The system of claim 8, wherein the instructions are further to cause the processor to determine the intermediate location based on one or more vehicles vacating a parking spot between the location of the parked transport and the modified pickup location.

15. A non-transitory computer readable medium comprising instructions, that when read by a processor, cause the processor to perform:
  detecting, by a processing node, a parking of a transport at a location associated with an event;
  determining, by the processing node, a pickup location and a pickup time of the transport based on a conclusion of the event;
  determining, by the processing node, a modified pickup time by the transport based on the conclusion of the event; and
  responsive to the modified pickup time, moving the transport to an intermediate location between the location of the parked transport and a modified pickup location based on the modified pickup time.

16. The non-transitory computer readable medium of claim 15, further comprising moving the transport to the modified pickup location when a device associated with the transport approaches the modified pickup location.

17. The non-transitory computer readable medium of claim 15, further comprising detecting the parking of the transport at the location based on video data received from at least one camera.

18. The non-transitory computer readable medium of claim 15, further comprising detecting the parking of the transport at the location based on a change in transport operation status.

19. The non-transitory computer readable medium of claim 15, further comprising detecting the parking of the transport at the location based on a transport sensor indicating an occupant of the transport has exited the transport.

20. The non-transitory computer readable medium of claim 15, further comprising determining the intermediate location based on one or more vehicles vacating a parking spot between the location of the parked transport and the modified pickup location.

* * * * *